(12) United States Patent
Madabhushi et al.

(10) Patent No.: US 8,593,999 B2
(45) Date of Patent: Nov. 26, 2013

(54) BANDWIDTH MANAGEMENT AND CODEC NEGOTIATION BASED ON WAN TOPOLOGY

(75) Inventors: Pramod Madabhushi, Schaumburg, IL (US); Jason Harper, Pleasanton, CA (US); Kent Fritz, Mountain View, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 1554 days.

(21) Appl. No.: 12/145,841

(22) Filed: Jun. 25, 2008

(65) Prior Publication Data

US 2009/0225747 A1  Sep. 10, 2009

Related U.S. Application Data

(60) Provisional application No. 61/034,309, filed on Mar. 6, 2008.

(51) Int. Cl.
| | |
|---|---|
| *H04B 1/44* | (2006.01) |
| *H04J 1/16* | (2006.01) |
| *H04L 12/26* | (2006.01) |
| *H04M 3/42* | (2006.01) |
| *H04M 1/00* | (2006.01) |

(52) U.S. Cl.
USPC ...... 370/282; 370/230; 370/236; 379/201.03; 379/201.12; 379/399.02

(58) Field of Classification Search
USPC ......... 370/265, 271, 282, 401, 465, 230, 236; 379/399.02, 201.02–201.12
See application file for complete search history.

(56) References Cited

U.S. PATENT DOCUMENTS

| | | | |
|---|---|---|---|
| 7,072,959 B2 | 7/2006 | Huart | |
| 7,260,060 B1 | 8/2007 | Abaye et al. | |
| 7,738,492 B2 | 6/2010 | Lauwers et al. | |
| 2003/0084277 A1 | 5/2003 | Przywara | |
| 2005/0083922 A1 * | 4/2005 | Takai et al. | 370/386 |
| 2005/0091392 A1 | 4/2005 | Gesswein et al. | |
| 2005/0193141 A1 | 9/2005 | Jensen | |

(Continued)

FOREIGN PATENT DOCUMENTS

KR  1020050002341  1/2005

OTHER PUBLICATIONS

PCT International Search Report and Written Opinion, PCT Application No. PCT/US09/31702, Mar. 3, 2009, 8 pages.

(Continued)

*Primary Examiner* — Un C Cho
*Assistant Examiner* — Jeremy Costin
(74) *Attorney, Agent, or Firm* — Patent Law Works LLP

(57) ABSTRACT

A system for bandwidth management and codec negotiation, according to one embodiment of the present invention comprises: a configuration storage module having supported codecs storage, codec lists and preferred site settings storage, and a call manager having an extension module, a trunk module, a location service engine, a codec manager, a bandwidth manager, and a media manager. The codec manager and the bandwidth manager used for negotiating a codec for a call between two endpoints. The present invention also includes a number of methods including a method for negotiating a codec for a call, a method for managing bandwidth for a call, a method for adding a description of a new codec supported by an endpoint, a method for adding an identifier of a supported codec to a codec list and a method for editing code site codec settings.

35 Claims, 12 Drawing Sheets

(56) References Cited

U.S. PATENT DOCUMENTS

| | | |
|---|---|---|
| 2006/0109838 A1 | 5/2006 | Smith et al. |
| 2006/0256810 A1 | 11/2006 | Yarlagadda |
| 2007/0019544 A1 | 1/2007 | Smith et al. |
| 2007/0118881 A1 | 5/2007 | Mitchell et al. |
| 2007/0140116 A1 | 6/2007 | Vega-Garcia |
| 2007/0156440 A1 | 7/2007 | Sorisho |
| 2007/0206505 A1* | 9/2007 | Forbes .......................... 370/252 |
| 2007/0258361 A1 | 11/2007 | McEwen |
| 2008/0013544 A1 | 1/2008 | Ginde et al. |
| 2008/0081648 A1* | 4/2008 | Kang et al. .................... 455/500 |
| 2008/0123687 A1 | 5/2008 | Bangalore et al. |
| 2008/0130563 A1* | 6/2008 | Xu et al. ....................... 370/329 |
| 2008/0192732 A1* | 8/2008 | Riley et al. .................... 370/352 |
| 2009/0028161 A1 | 1/2009 | Fullarton et al. |
| 2009/0225747 A1 | 9/2009 | Madabhushi et al. |
| 2009/0327499 A1 | 12/2009 | Strickland et al. |

OTHER PUBLICATIONS

European Supplementary Search Report, Appl. No. 09716587.2, Nov. 3, 2011, 9 pgs.

International Search Report and Written Opinion of International Application No. PCT/US2011/48489, Dec. 22, 2011, 14 pgs.

Avaya Communication Manager Network Region Configuration Guide, Jul. 2004, 24 pgs.

Mitel 3300 IP Communications Platform, Engineering Guidelines Release 8.0, Jul. 2007, 310 pgs.

Mitel 3300 IP Communications Platform, Engineering Guidelines Release 9.01, Sep. 2008, 340 pgs.

* cited by examiner

Supported Codecs

| Name | Bandwidth (in kbps) | Default |
|---|---|---|
| AAC_LC/32000 | 96 | Yes |
| BV16/8000 | 16 | Yes |
| BV32/16000 | 32 | Yes |
| DVI4/8000 | 32 | Yes |
| G722/8000 | 64 | Yes |
| G729/8000 | 8 | Yes |
| L16/16000 | 256 | Yes |
| L16/8000 | 128 | Yes |
| PCMA/8000 | 64 | Yes |
| PCMU/8000 | 64 | Yes |

0 records checked.

Figure 9B http://10.117.0.53 – Supported Codec Info – Microsoft Internet Explorer Name: G726/8000
Bandwidth (in kbps): 16
☐ Default

[Save] [Close] [Previous] [Next]

© 1998-2007 ShoreTel, Inc. All rights reserved.

Figure 10A

Codec List ~1002

Codec Group List
Delete | New... ~1008

Description ~1004

- Fax Codecs - High Bandwidth
- Fax Codecs - Low Bandwidth
- High Bandwidth Codecs
- Low Bandwidth Codecs
- Medium Bandwidth Codecs
- Very High Bandwidth Codecs
- Very Low Bandwidth Codecs

Codec Lists ~1012
Edit Codec Lists

Edit this record

Name: ~1016 [Medium Bandwidth Co] ~1014

New | Copy | Save | Delete | Reset
      1028   1030   1032   1034   1036

Refresh this page

Choose Codecs:

L16:8000
LRWB:16000
LRHB:8000
AAC_LC:8000
PCMA:8000
G7221:32000
G7221:24000
G726:8000

Codec List Members: ~1018

G722:8000
BV32:16000
PCMU:8000
DVI4:8000
BV16:8000
G729:8000

Add >> ~1020
<< Remove ~1022
Move Up ^ ~1024
Move Down v ~1026

Sites — 1102
Edit Site

[New] 1118  [Copy] 1120  [Save] 1122  [Delete] 1124

Edit this record | Refresh this page

1104 {
- Name: Headquarters
- Country: United States of America
- Language: English(US)
- Parent: Top of Tree
- ☑ Use Parent As Proxy
- Local Area Code: 408
- Additional Local Area Codes: [Edit]
- Caller's Emergency Service Identification (CESID): _____ (e.g. +1 (408) 331-3300)
- Time Zone: (GMT-06:00) Central Time (US & Canada), Central Standard T
- Night Bell Extension:
- Night Bell Switch: None — Edit Night Bell Call Handling
- Paging Extension:
- Paging Switch: None
- Operator Extension: [Search]
- FAX Redirect Extension: 122 : SiteFax [Search]
}

Bandwidth:
1106 {
- Admission Control Bandwidth: 1000 kbps — 1110
- Intra-Site Calls: High Bandwidth Codecs — 1112
- Inter-Site Calls: Low Bandwidth Codecs — 1114
- FAX and Modem Calls: Fax Codecs — 1116
}

SIP Proxy:
1108 {
- Virtual IP Address: 10.117.0.56
- Proxy Switch 1: Old Fuji
- Proxy Switch 2: None
}

Figure 11

BANDWIDTH MANAGEMENT AND CODEC NEGOTIATION BASED ON WAN TOPOLOGY

CROSS-REFERENCE TO RELATED APPLICATION

This application claims the benefit of U.S. Provisional Application No. 61/034,309, filed Mar. 6, 2008, titled "Bandwidth Management And Codec Negotiation Based On WAN Topology," which is hereby incorporated herein by reference.

BACKGROUND OF THE INVENTION

1. Field of the Invention

The present invention relates telephony systems such as that using Voice over Internet Protocol (VoIP). In particular, the present invention relates to users with administrative rights defining new codecs to be supported by a telephony system and to negotiating a codec to place a call in the telephony system.

2. Description of the Background Art

The prior art includes a variety of distributed telephony systems. Traditional switched network systems have given way to new telephony systems that use VoIP. These VoIP systems offer the same functionality as more traditional switched system such as the ability to transfer calls, put calls on hold, automated attendant functions, hunt groups, etc. VoIP systems use a codec during a call to convert analog signals to a compressed digital bit stream. The codecs allow VoIP systems to transmit encoded audio, video or data across Internet Protocol networks. Each codec has an associated bandwidth, which is a factor in determining the bandwidth allocated for a call along with other factors such as the bandwidth required for the network protocol headers and the packetization rate. For example, if at the initiation of a call it is determined that codec PCMU/8000 with an associated bandwidth of 64 kbps will be used for the call, then accordingly sufficient bandwidth is allocated.

Existing VoIP systems work one of two ways, either they are programmed to support specific codecs and only allow endpoints (e.g., IP phones, software phones) to use those codecs or they blindly pass through the codecs offered by the endpoints but do not attempt to account for bandwidth or do not provide administrative control over the priority of the various codecs.

SUMMARY OF THE INVENTION

The present invention overcomes the deficiencies and shortcomings of the prior art by providing a system and method for bandwidth management and codec negotiation. The system of the present invention is particularly advantageous because it allows end users to instruct a telephony system on how to correctly account for new codecs, thus enabling the telephony system to allow endpoints to negotiate the usage of any codecs that they support. The system is also advantageous because it provides a structure for managing use of codecs in an IP telephony system. In one embodiment, the system of the present invention comprises: a configuration storage module having supported codecs storage, codec lists and preferred site settings storage, and a call manager having an extension module, a trunk module, a location service engine, a codec manager, a bandwidth manager and a media manager. The codec manager and the bandwidth manager are used for negotiating a codec for a call between two endpoints. The present invention also includes a number of methods including a method for negotiating a codec for a call, a method for managing bandwidth for a call, a method for adding a description of a new codec supported by an endpoint, a method for adding an identifier of a supported codec to a codec list and a method for editing site codec settings.

BRIEF DESCRIPTION OF THE DRAWINGS

The invention is illustrated by way of example, and not by way of limitation in the figures of the accompanying drawings in which like reference numerals are used to refer to similar elements.

FIG. 9A is an example of a supported codecs panel according to one embodiment of the present invention.

FIG. 9B is an example of a new codec panel according to one embodiment of the present invention.

FIG. 10A is an example of a codec list panel according to one embodiment of the present invention.

FIG. 10B is an example of an edit codec list panel according to one embodiment of the present invention.

FIG. 11 is an example of an edit site panel according to one embodiment of the present invention.

DETAILED DESCRIPTION OF THE PREFERRED EMBODIMENTS

Figure 1:
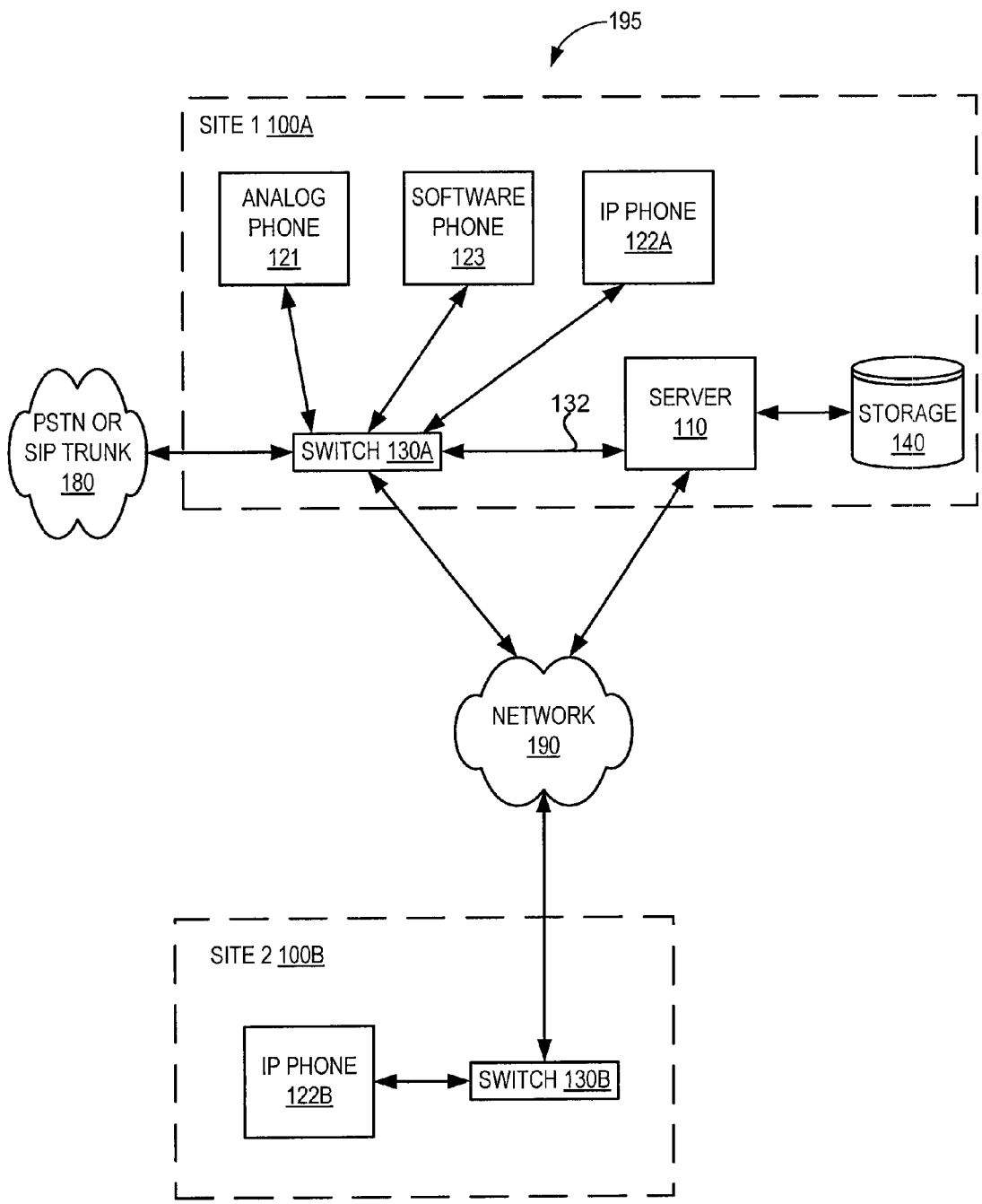
FIG. 1 is a high-level block diagram illustrating a functional view of a distributed telephony system according to one embodiment of the present invention.

A system and method for managing codecs supported by a telephony system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to system operation and particular hardware. However, the present invention applies to any type of computing device that can receive a data and commands, and any peripheral devices providing services.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Enterprises often have several offices or call centers that are located in a plurality of disparate locations. To interconnect all of these sites, enterprise telephony systems have been developed. Enterprise telephony systems, which comprise a distributed set of voice switches and servers, offer enterprise applications enabled by the integration of computer systems with telephony services. The software that supports the computer-integrated functionality is generally implemented as a client-server environment in which the participants or clients (distributed telephony users) communicate with a server. Computer-integrated features rely not only on a server's application platform but also on the availability of the network that connects the switches, servers and application services.

FIG. 1 illustrates a block diagram of a distributed telephony system 195, according to one embodiment of the present invention. The illustrated embodiment of telephony system 195 includes a first site 100A and a second site 100B. As used herein, a site represents a grouping of resources. In the illustrated embodiment, the two sites 100A, 100B are communicatively coupled via a network 190. One skilled in the art will note that sites 100A, 100B can be physically distinct from each other or merely topology-related groupings that are not in physically distinct locations. The telephony system 195 architecture in FIG. 1 is used only by way of example. While FIG. 1 illustrates two sites, the present invention applies to any system architecture containing one or more sites.

The first site 100A includes a server 110, a switch 130A, three endpoints (analog phone 121, IP phone 122A and software phone 123) and a storage device 140. The switch 130A represents a Voice over Internet Protocol (VoIP) device to which a number of endpoints can be coupled, such as analog phones 121, IP phones 122A and software phones (softphones) 123. In the illustrated embodiment, the switch 130A is coupled to the network 190. The switch 130A is also coupled to the public switched telephone network (PSTN) trunk 180 via an analog or digital trunk line (e.g., a T1 or E1 interface) or a SIP trunk service provider. In the illustrated configuration, the switch 130A provides an interface for calls originating from or terminating on the PSTN or SIP trunk 180. Although only a single switch 130A is shown in FIG. 1, those skilled in the art will recognize that a particular site such as the first site 100A may include a plurality of switches. The switch 130 will be described in more detail below with reference to FIG. 2.

An endpoint enables a user to carry on a phone call. Although in the illustrated embodiment the first site 100A has three endpoints (one analog phone 121, one IP phone 122A and one softphone 123), in other embodiments the first site 100A has different numbers and types of endpoints. Examples of endpoints include a video conferencing device, a multipoint control unit (MCU), a conference bridge, an analog terminal adapter (ATA), and any other device that originates and/or terminates a media stream. An endpoint is coupled to the switch 130, the server 110, or both. Each of the endpoints can also include a display device (not shown) that is used in conjunction with the phone of the endpoint.

In one embodiment, an endpoint has a user interface to send data to and receive data from a user. The analog phone 121 has, for example, a Telephone User Interface (TUI) that sends data through a speaker and receives data through a microphone and a keypad. The IP phone 122A has, for example, both a TUI and a graphical user interface (GUI) that sends data through a display device associated with the IP phone 122A. In one embodiment, the IP phone's graphical user interface also receives data from a touch screen display device associated with the IP phone 122A. The softphone 123 has, for example, a software application that runs on a computer and sends data through a display device and a speaker and receives data through a microphone, a keyboard and a pointing device.

The server 110 is configured to implement features or functions of the telephony system in accordance with the present invention. The server 110 is coupled to the network 190 and although not shown can also be coupled to one or more endpoints, such as IP phone 122A and softphone 123. The server 110 implements a server architecture according to one embodiment of the present invention. Server 110 includes a processor. The processor can be a conventional processing device, such as a general-purpose microprocessor. Server 110 also includes a memory. The memory includes program instructions or functional units that in one embodiment implement features of the present invention. Specifically, the memory includes a telephony management software (TMS) unit, a telephony application programming interface (TAPI) unit and a directory unit. In one embodiment, the memory also includes one or more application units that interact with the TMS unit and the TAPI unit to enable a specific computer-integrated function. An application unit uses the TAPI unit to exchange data with the TMS unit. The TMS unit is able to communicate with and manage one or more switches 130. For example, with reference to FIG. 1, the TMS unit included in the server 110 can manage the switches 130A, 130B. Through the TAPI unit, the TMS unit presents an application with computer-telephony integration (CTI) view of these switches 130A, 130B. This allows the application to manage the switches 130A, 130B. Such switches 130A, 130B operate without an associated TMS unit if CTI features are not being used. The server has a user interface to send data to and receive data from a user. The user interface interacts with TMS in order to allow a user with administrative rights to manage the switches and change the configuration settings of the switches. The user can access the user interface at the server or at an endpoint (e.g., soft phone).

The server 110 includes one application unit—directory unit. In general, the directory unit enables a phone to access a directory and use the directory in conjunction with other phone functions. In one embodiment, directory unit is implemented as a service that interacts with TMS unit. Communication or data exchange is between TMS unit and directory unit. The directory unit can be distributed among computing devices as is known to one of skill in the art. For example, the functionality enabled by directory unit can be implemented in a client-server fashion by having the client (user's local system, such as a general-purpose computer or endpoint) perform some functions and having the server 110 (directory unit) perform others. As another example, some or all of the functionality enabled by directory unit can be implemented by having a switch 130 perform some or all functions.

The storage device 140 contains directory information, including directory entries and associations between directories and phones. In one embodiment, the storage device 140 also includes information regarding which users have administrative rights to access the server's user interface and make changes to the configuration settings of the switches. For example, the storage device 140 will include the user name and password of users with administrative rights. In one embodiment, the storage includes data that is accessed by the switches in order to operate. In the illustrated embodiment, the storage device 140 is directly coupled to the server 110. In an alternate embodiment, the storage device 140 is coupled to the server 110 via the network 190.

One skilled in the art will appreciate that additional networking devices (not shown) can be added to the first site 100A, for example, if needed to support additional endpoints, servers 110, switches 130 or other systems. For example, the first site 100A can include a second switch 130B and an edge router to couple the first site 100A to the network 190 and to provide local area connectivity for the first and second switches 130A, 130B. One skilled in the art will also recognize that numerous configurations of switches 130 and communications links are contemplated. For example, PSTN links can be coupled to multiple switches 130 at several points within the topology and soft-switches 130 can also be used.

The second site 100B similarly includes an endpoint (IP phone 122B) and a switch 130B. The configuration of the second site 100B demonstrates that a server is not required for each site. Switch 130B of the second site 100B can be managed by server 110 that is illustrated in the first site 100A. A call can involve more than one switch. For example, a call that originates from the PSTN or SIP trunk 180 and terminates on an endpoint that is communicatively coupled to switch 130B of the second site 100B involves two switches: switch 130A of the first site 100A and switch 130B of the second site 100B. In addition, each switch 130A, 130B can be managed by a different server 110.

In one embodiment of the present invention, the network 190 is a partially public or a wholly public network such as the Internet. The network 190 can also be a private network or include one or more distinct or logical private networks (e.g., virtual private networks or wide area networks). Additionally, the communication links to and from the network 190 can be wire line or wireless (i.e., terrestrial- or satellite-based transceivers). In one embodiment of the present invention, the network 190 is an IP-based wide or metropolitan area network.

Switch 130

Figure 2:
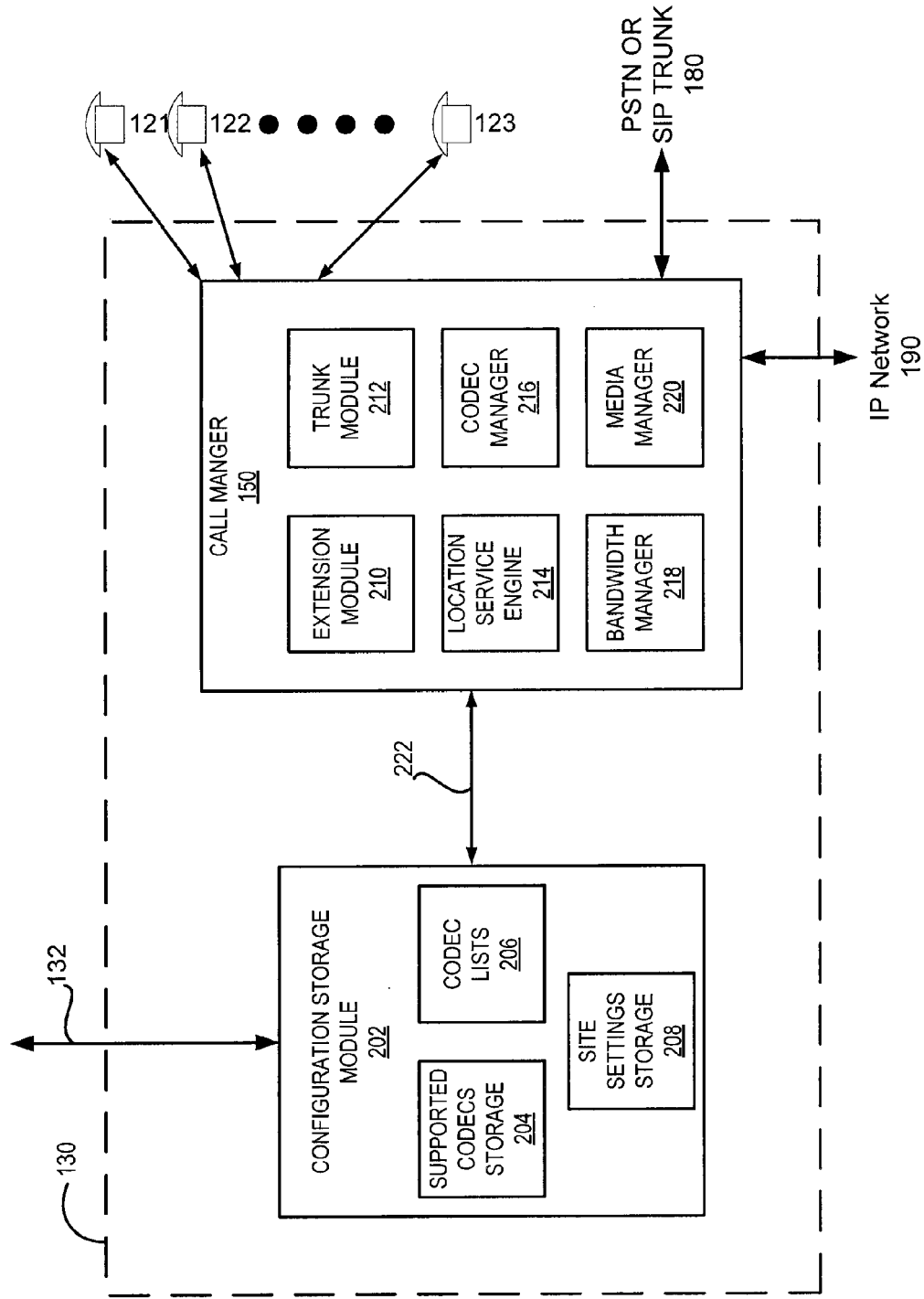
FIG. 2 is a high-level block diagram illustrating a switch according to one embodiment of the present invention.

Referring now to FIG. 2, an embodiment of the switch 130 according to one embodiment of the present invention is shown. In this embodiment, switch 130 is configured to implement features or functions of the present invention. Switch 130 includes a processor. The processor can be a conventional processing device, such as a general-purpose microprocessor. Switch 130 also includes a memory. The memory also includes software and routines (not shown) conventionally used to operate a switch in a VoIP telephony system. For example, the switch 130 includes software routines for performing call monitoring, transferring calls, placing calls on hold, establishing hunt groups, automated attendant functions, etc. The memory also includes program instructions or functional units that implement the features of the present invention. The switch 130 also includes a configuration storage module 202 and a call manager 150.

The configuration storage module 202 is for storing preferences, settings and other information utilized by the call manager 150 to perform its functions. In one embodiment, the configuration storage module 202 is a portion of the memory of the switch 130. To enable the feature of adding a description of a new codec and using a codec to place a call in the telephony system 195, the configuration storage module 202 includes a supported codecs storage 204, codec lists 206, and a preferred site settings storage 208. In one embodiment, the supported codecs storage 204 is a storage that includes a description of the properties of each codec supported by switch 130. In another embodiment, the supported codecs storage 204 is a storage that includes a description of the properties of each codec supported by the telephony system 195. In one embodiment, the description included in the supported codecs storage 204 for each supported codec includes an identification string and the codec's bandwidth. In one embodiment, the identification string is comprised of the name and the sampling rate of the codec. A codec's bandwidth is used by call manager 150 to allocate bandwidth as calls are initiated using the codec.

In one embodiment, telephony system 195 is initially installed with descriptions of specific codecs stored in the supported codecs storage 204 of the configuration storage module 202. Codecs for which a description is initially stored in the supported codecs storage 204 are referred to as default codecs. The descriptions of codecs stored in the supported codecs storage 204 can be modified or deleted by a user with administrative rights using the server's user interface at the server 110 or at an endpoint (e.g., softphone 123). In one embodiment, descriptions of default codecs initially stored in the supported codecs storage 204 cannot be modified or deleted. Additionally, a user using the server's user interface can store a description of a new codec in the supported codecs storage 204.

The codec lists 206 include an identification of one or more codecs supported by the switch 130. In one embodiment, an identification of a codec is the name of the codec or the identification string of the codec. The codecs that are part of each codec list 206 are ranked in a priority order. A codec list 206 is referenced by switch 130 to negotiate a codec to use for a call. The specific codec list 206 used for negotiating a codec for a call depends on stored settings and the type of call.

A codec list 206 can be modified or deleted by a user via an endpoint or server 110. Modifying a codec list 206 could include adding or removing an identification of one or more codecs and changing the ranking of codecs in the codec list 206. In addition, new codec lists can be created by a user with administrative rights at an endpoint or server 110. In one embodiment, telephony system 195 is initially installed with specific codec lists 206. In one embodiment, codec lists 206 initially installed with the telephony system 195 cannot be deleted or modified.

The site settings storage 208 includes general settings information for site 100. Specifically, the site settings storage 208 includes bandwidth settings for site 100. The bandwidth settings indicate which codec list 206 should be used for each type of call. In one embodiment, there are three different types of calls: intra-site calls, inter-site calls, and fax and modem calls. Intra-site calls are calls within site 100, inter-site calls are calls between two different sites, and fax and modem calls are calls that involve data transfer. Additionally, bandwidth settings include the amount of bandwidth allocated for site 100. If a site is coupled to more than one wide area network (WAN), the site settings storage 208 includes information as to which WANs the site is connected to and bandwidth settings for each WAN. For example, if a first site is coupled to multiple WANs, the site settings storage 208 may include information that the first site is coupled to a second site by a first WAN and that the first site is coupled to a third site by a second WAN. Additional settings information stored on the site settings storage 208 includes for example, the name of the site, the location of the site, or the bandwidth available in the site. The settings information stored in the site settings storage 208 can be modified by a user with administrative rights using the server's user interface.

The configuration storage module 202 is coupled by a signal line 132 to the server 110. The server 110 uses the signal line 132 to download information to the configuration storage module 202. The information downloaded by the server 110 includes the information noted above to allow the call manager 150 to perform its conventional functions. In accordance with the present invention, the server 110 also uses signal line 132 to maintain and keep the supported codecs storage 204, the codec lists 206, and the site settings storage 208 current. In other words, anytime the server 110 receives instructions from a user to add, remove or modify descriptions of supported codecs, codec lists or site codec settings via the user interface, the server 110 updates the information stored in the configuration storage module 202. In one embodiment, anytime another call manager 150, server 110 or site 100 adds, removes or modifies descriptions of supported codecs, codec lists or site codec settings, the information is propagated to server 110 and server 110 in turn updates the information stored in the configuration storage module 202. The configuration storage module 202 is also coupled by signal line 222 to the call manager 150. The configuration storage module 202 uses this coupling to provide stored information to the call manager 150.

A device, such as the processor of the switch 130A, runs the call manager 150 software application and is coupled to and controls one or more endpoints 121, 122A, and 123 with which it is associated. While shown as operational and as part of the switch 130 in FIG. 2, those skilled in the art will recognize that in other embodiments, the call manager 150 may be operational as a separate module in the first site 100A or as part of server 110 of FIG. 1.

Although in the illustrated embodiment the first site 100A has only one call manager 150 in switch 130A, in other embodiments the first site 100A has a different number of call managers 150. Also, more than one call manager 150 can control the same endpoint. The association between a call manager 150 and an endpoint that it controls is accessed through the server 110. Furthermore, although not shown, the second switch 130B includes its own call manager 150.

As shown in FIG. 2, the call manager 150 is coupled to the PSTN or SIP trunk 180 and the network 190. The call manager 150 comprises an extension module 210, a trunk module 212, a location service engine 214, a codec manager 216, a bandwidth manager 218, and a media manager 220.

The extension module 210 communicates with endpoints coupled to the call manager 150 in order to allow a user to perform call-related functions on an endpoint. In addition, the extension module 210 is used to communicate with other call managers in the telephony system 195.

The trunk module 212 is coupled to and controls the interaction between the endpoints 121, 122A and 123 and the PSTN or SIP trunk 180. In particular, the call manager 150/switch 130 is often coupled to a trunk line. The trunk module 212 of the call manager 150 manages the usage of the trunk line by multiple endpoints 121, 122A and 123 optimizes the usage of the trunk line. The trunk module 212 also manages trunk services such as caller identification, direct inward dial, etc.

The location service engine 214 resolves the dialed numbers (converts raw dialed digits into routable contacts) and routes the call to the destination endpoint such a phones, trunk, hunt group, auto attendant, pickup group etc.

The codec manager 216 is coupled to the network 190 and at the initiation of a call between two endpoints negotiates with the endpoints or with another call manager 150, which codec to use for the call. The codec manager 216 uses information stored in codec lists 206 and the site settings storage 208 to negotiate a codec for a call. The functionality of the codec manager 216 is further described below with reference to FIGS. 8A and 8B.

The bandwidth manager 218 is coupled to the network 190 and allocates bandwidth necessary to support calls handled by the call manager 150. For each call the bandwidth manager 218 allocates bandwidth based on the codec negotiated by the codec manager 216. If the bandwidth manager 218 allocates bandwidth for a call prior to the codec manager 216 finalizing the codec negotiation, the bandwidth manager 218 updates the allocated bandwidth once the codec has been negotiated for the call. The amount of bandwidth that the bandwidth manager 218 allocates for a call is based on the bandwidth associated with the codec being used for the call.

The bandwidth manager 218 can allocate use of particular routers, LANs, WANs or other portions of the network to provide the bandwidth necessary to support the calls going through the switch 130. If a site is coupled to multiple WANs the bandwidth manager 218 determines which WAN to allocate bandwidth on. For example, a first site is coupled to a second site by a first WAN and coupled to a third site by a second WAN. If a call is being initiated between the first site and the second site, the bandwidth manager 218 on the first site allocates bandwidth on the first WAN because that is the WAN that couples the first site to the second site.

The media manager 220 creates and manages media streams. The media manager 220 also handles call control and converting audio waveforms to and from Real-time Transport Protocol (RTP) packets using the sampling rate of the codec negotiated for the call. The media manager 220 is coupled for communication with the network 190 and the endpoints 121, 122A and 123. The media manager 220 also performs encoding/decoding in case of analog endpoints and physical trunks using the sampling rate of the codec negotiated for the call.

Methods and Examples

Figure 4:
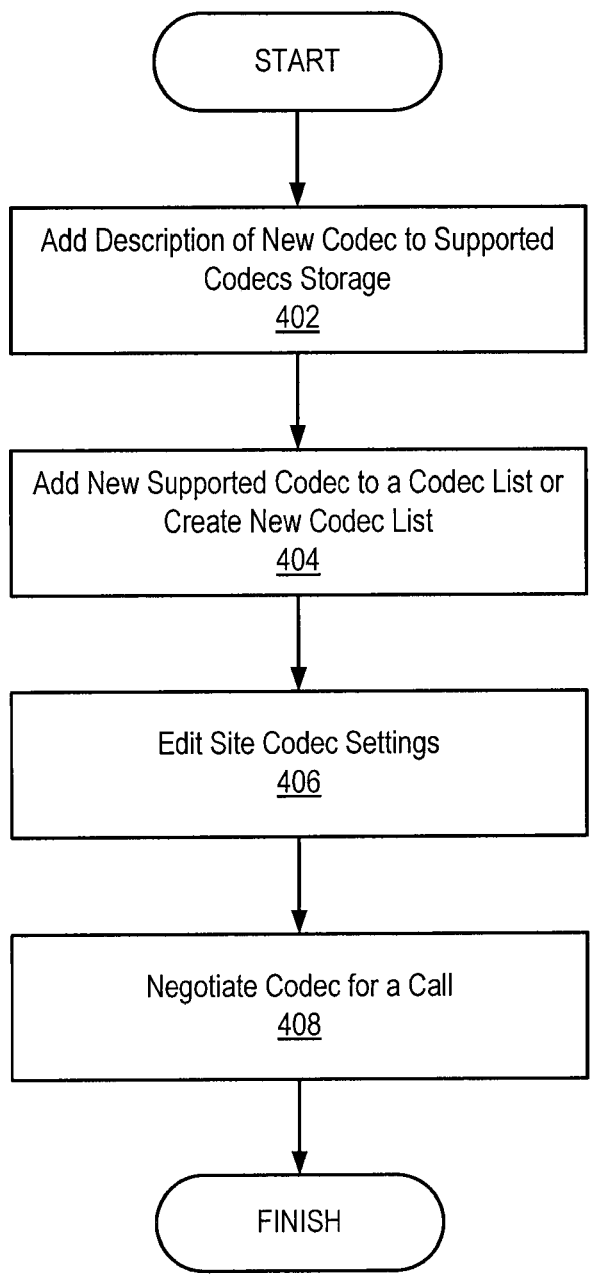
FIG. 4 is a flowchart illustrating a method for initiating a call between two endpoints according to one embodiment of the present invention.

Referring now to FIG. 4, a method 400 for initiating a call between two endpoints is described. Those of skill in the art will recognize that other embodiments can perform the steps of FIG. 4 asynchronously or in different orders. Moreover, other embodiments can include different and/or additional steps than the ones described herein.

The method 400 begins with the server 110 providing the user interface that allows a user with administrative rights to add 402 a description of a new codec to the supported codecs storage 204 in the configuration storage module 202. In one embodiment, through the user interface, the user provides the identification string (e.g., G726/8000) and the bandwidth (e.g., 16 kbps) of the new codec. The server 110 stores the received codec description in the supported codecs storage 204. Switch 130 supports the new codec once the description of the new codec is stored in the supported codecs storage 204.

The new supported codec is added 404 to a codec list by the user via the server's 110 user interface. Alternatively, a new codec list can be created and the new codec is added to the new codec list. In one embodiment, the new codec cannot be added to an existing codec list that is protected from being edited. Once the new codec has been added to the codec list by the user, the information of the codec list is stored by the server 110 in the configuration storage module 202.

The user uses the server's 110 user interface to edit 406 site codec settings. As part of the site codec settings, the user selects a codec list to use for each type of call (e.g., intra-site call, inter-site call, and fax and modem call). Additionally, the user can edit other basic site codec settings, such as the bandwidth reserved for the site 100. The site codec settings information received from the user is stored by the server 110 in the site settings storage 208 of the configuration storage module 202. When a call is initiated between two endpoints, one or more call managers 150 use the information stored in the configuration storage module 202 to negotiate 408 a codec for the call. It should be understood that steps 402, 404, and 406 can each be performed by a different user with administrator rights. Additionally, not all steps in method 400 are necessary to initiate a call. For example, a description of a new codec does not have to be added to the supported codecs storage 204, nor does the new supported codec have to be added to a codec list. Default codecs and codec lists 206 can be used to initiate a call.

Figure 5:
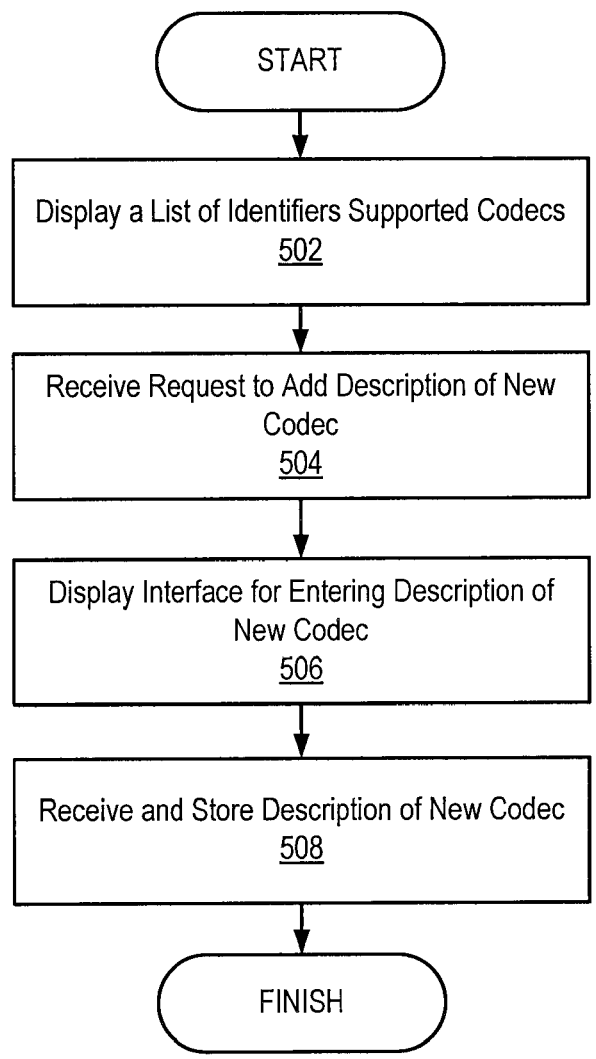
FIG. 5 is a flowchart illustrating a method for adding a description of a new codec to supported codecs storage according to one embodiment of the present invention.

FIG. 5 is a method 402 for adding a description of a new codec to the supported codecs storage 204 in the configuration storage module 202, which is step 402 of FIG. 4. Those of skill in the art will recognize that other embodiments can perform the steps of FIG. 5 asynchronously or in different orders. Moreover, other embodiments can include different and/or additional steps than the ones described herein.

Initially, the server 110 displays 402 to a user a list of identifiers of codecs supported by the call manager operating on the switch 130. In one embodiment, the server 110 displays the list of identifiers of codecs supported by the call manager on the switch 130 in a supported codecs panel at the server 110 or at an endpoint running the server's 110 user interface. With each identifiers of a supported codec, the supported codecs panel includes the bandwidth associated with the supported codec. In one embodiment, the supported codec list panel also indicates whether each supported codec is a default codec.

Next, the server 110 receives 504 a request from the user to add a description of a new codec. The server 110 displays 506 an interface that allows the user to enter the description of the new codec. In one embodiment, the server 110 displays a new codec panel which allows the user to enter the identification string and bandwidth of the new codec. When the user enters all required information in the new codec panel, the server 110 allows the user to save the description of the new codec.

Upon the user selecting to save the description of the new codec, the server 110 receives 508 and stores the description of the new codec at all switches 130 in the site 100, specifically in each switch's 130 configuration storage module 202. In one embodiment, the new codec and the information for the new codec are stored at all switches in the telephony system 195. In an alternate embodiment, the description of the new codec is stored at select switches in the telephony system 195. A switch 130 supports the new codec once the description of the new codec is stored in the switch's 130 configuration storage module 202.

FIG. 9A is an example of the supported codecs panel 902. The name column 904 has the identification strings of the codecs supported by the switch 130. In one embodiment, each codec identification sting is comprised of the name and sampling rate of the codec. The bandwidth column 906 identifies the bandwidth required by the codecs in the name column 904. The default column 908 indicates whether the codec in the name column 904 is a default codec. If the default column indicates "Yes", it signifies that the codec in the same row was initially installed with the telephony system 195. On the other hand, if the default column indicates "No", it signifies that the codec in the same row was added by a user with administrative rights after the telephony system 195 was installed. To delete the descriptions of one or more codecs, the respective boxes in the first column are selected for those codecs and the delete button 910 is pressed. Pressing the new button 912 causes the new codec panel 914 to appear.

FIG. 9B is an example of the new codec panel 914 that is presented to a user when the user presses on the new button 912 of FIG. 9A. The name entry field 916 is where a user enters the identification string of the new codec, which in this case is "G726/8000". The identification string must be entered in the name entry field 916 exactly as expected by devices in the telephony system 195. The bandwidth entry field 918 is where the user enters the bandwidth of the new codec. Default field 920 is checked if the codec in the name entry field was originally installed with the telephony system 195. In this case, default field 920 is not checked, which means the new codec is being added after the telephony system 195 was installed. Pressing save button 922 causes the server 110 to store the description of the new codec. Pressing the close button 924 closes the new codec panel 914 without saving any changes. Previous button 926 and next button 928 allow the user to navigate through the codecs listed in the supported codecs panel 902 to view and possibly edit the description of a supported codec.

Figure 6:
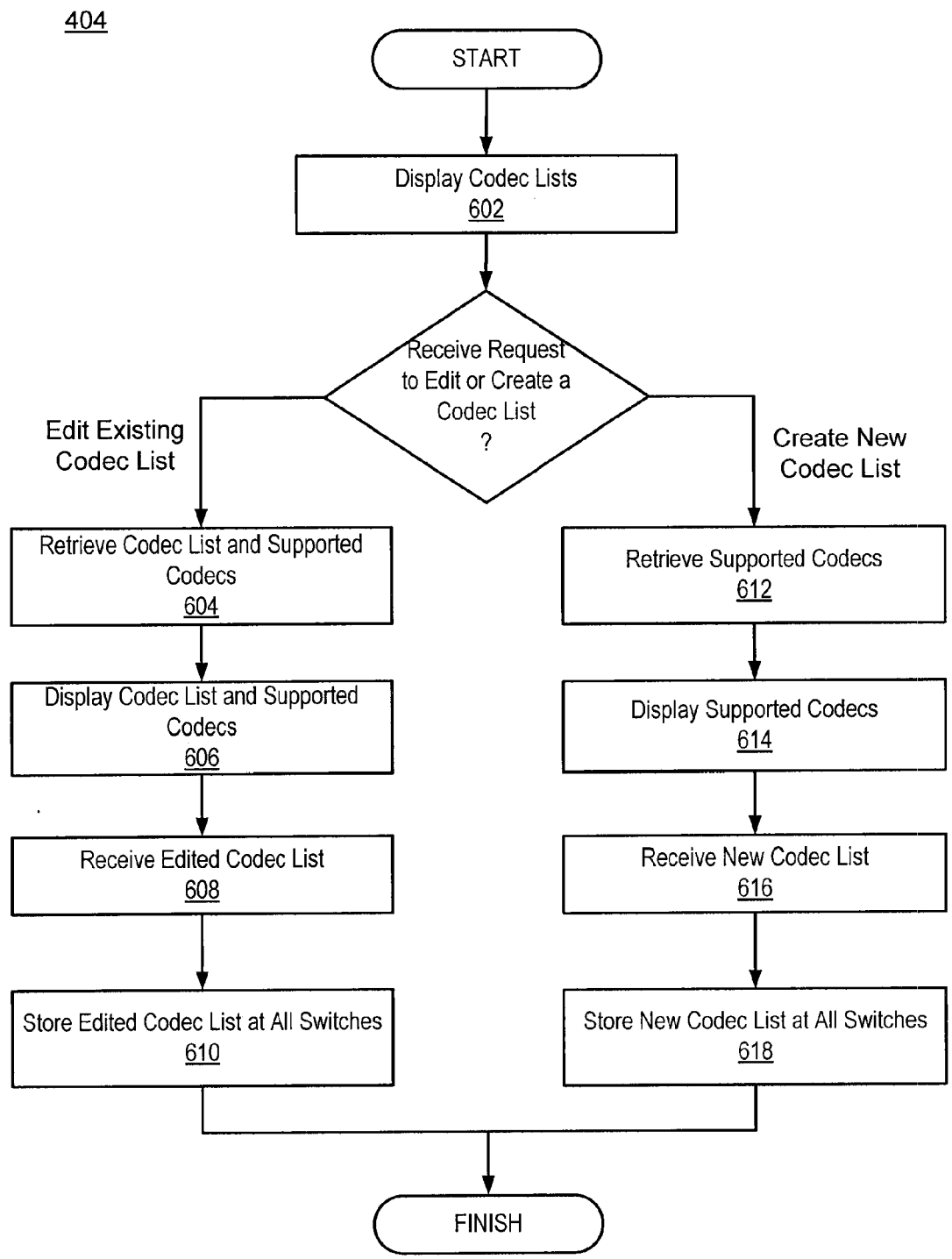
FIG. 6 is a flowchart illustrating a method for adding a new supported codec to a codec list according to one embodiment of the present invention.

FIG. 6 is a method 404 for adding a new supported codec to a codec list or to create a new codec list, which is step 404 of FIG. 4. Those of skill in the art will recognize that other embodiments can perform the steps of FIG. 6 asynchronously or in different orders. Moreover, other embodiments can include different and/or additional steps than the ones described herein.

Initially, the server 110 displays 602 codec lists stored in the configuration storage module 202 to a user at the server 110 or at an endpoint running the server's 110 user interface. In one embodiment, the server 110 displays the codec lists in a codec list panel that allows the user to select whether to edit an existing codec list or create a new codec list. When the user requests to edit an existing codec list or to create a new codec list, a corresponding request is transmitted to the server by the user.

If the server 110 receives from the user a request to edit an existing codec list, the server 110 retrieves 604 the codec list and the identification string of each supported codec from the configuration storage module 202. The server 110 displays 606 the codec list and the supported codecs to the user. In one embodiment, the server 110 displays the codec list and the supported codecs in an edit codec list panel, which allows the user to add an identifier of the new supported codec and other supported codecs to the codec list. Additionally, the edit codec list panel may be used by the user to remove an identifier of a codec from the codec list or change the ranking of the codecs in the codec list. Upon the user selecting to save edits made to the codec list, the server 110 receives 608 the edited codec list. The edited codec list is stored 610 by the server 110 at all switches 130 in the site 100, specifically in each switch's configuration storage module 202. In one embodiment, the edited codec list is stored at all switches in the telephony system 195. In an alternate embodiment, the edited codec list is stored at select switches in the telephony system 195.

Alternatively, if the server 110 receives from the user a request to create a new codec list, the server 110 retrieves 612 identification string of each supported codec from the configuration storage module 202 and displays 614 the supported codecs to the user. In one embodiment, the server 110 displays the supported codecs in a new codec list panel, which allows the user to name the new supported codec list, add an identifier of the new supported codec, and identifiers of other supported codecs to the new codec list. Upon the user selecting to save the new codec list, the server 110 receives 616 the new codec list. The new codec list is stored 618 by the server 110 at all switches 130 in the site 100, specifically in each switch's configuration storage module 202. In one embodiment, the new codec list is stored at all switches in the telephony system 195. In an alternate embodiment, the new codec list is stored at select switches in the telephony system 195.

FIG. 10A is an example of the codec list panel 1002. Each line in description column 1004 corresponds to the name of a codec list stored in the configuration storage module 202. To delete one or more codec lists, the respective boxes in the first column are selected for those codec lists, and delete button 1006 is pressed. Pressing new button 1008 causes a panel to appear that allows a user to create a new codec list. Each name in the description column is a link that when pressed, causes the edit codec list panel 1012 (See FIG. 10B) to be displayed for the editing of the corresponding codec list. In one embodiment, specific codec lists cannot be deleted or edited.

FIG. 10B is an example of the edit codec list panel 1012 that allows a user to view or edit an existing codec list. The name field 1014 has the name of the codec list that is being viewed or edited. The choose codecs region 1016 displays an identification string of each codec supported by call manager 150 and that are not members of the codec list. Codec list members region 1018 displays an identification string of each codec that is part of the codec list. A codec can be added to the codec list by selecting an identification string of desired codec in the choose codecs region 1016 and then pressing add button 1020. To remove a codec from the codec list, an identification string of a desired codec in the codec list members region 1018 is selected and remove button 1022 is pressed. To change the ranking of a codec within the codec list members region 1018, an identification string of a desired codec is selected in the codec list members region 1018, and move up button 1024 or move down button 1026 is pressed. To save changes to the codec list, save button 1032 is pressed. The new button 1028 is pressed to create a new codec list. To use the displayed codec list as a template for a new codec list, copy button 1030 is pressed. Pressing delete button 1034, deletes the codec list that is being viewed. To revert the codec list to the last saved version, reset button 1036 is pressed.

Figure 7:
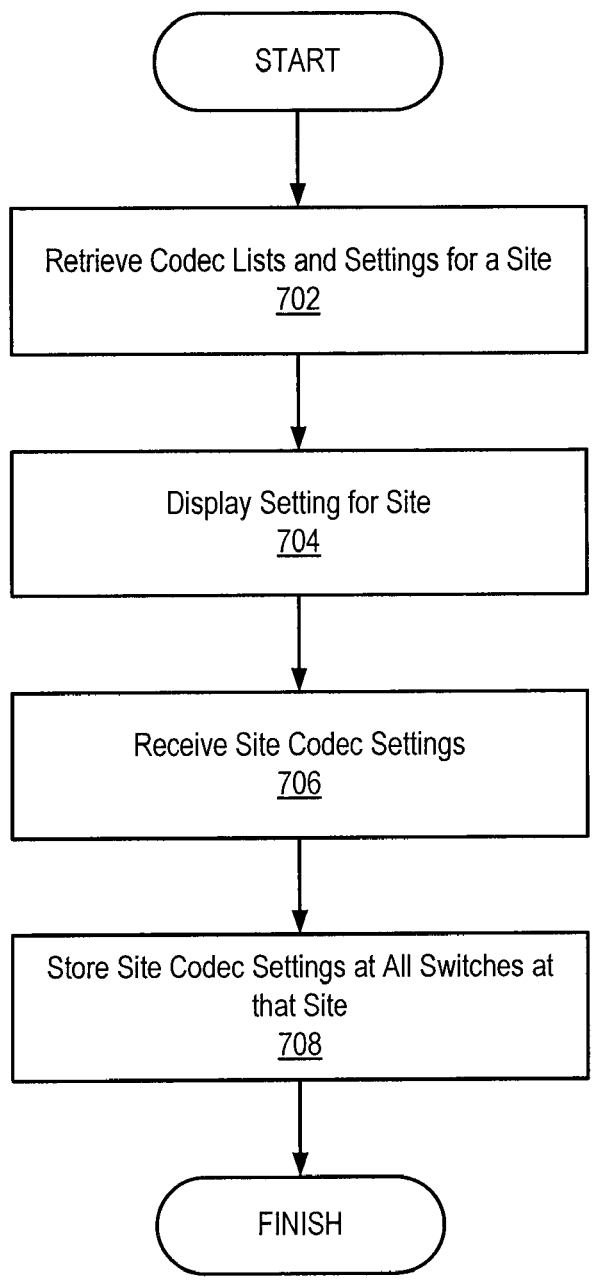
FIG. 7 is a flowchart illustrating a method for editing site codec settings according to one embodiment of the present invention.

FIG. 7 is a method 406 for editing codec settings of site 100, which is step 406 of FIG. 4. Those of skill in the art will recognize that other embodiments can perform the steps of FIG. 7 asynchronously or in different orders. Moreover, other embodiments can include different and/or additional steps than the ones described herein.

Initially, the server 110 retrieves 702 the names of codec lists stored in the configuration storage module 202 and the current settings for site 100 stored in the configuration storage module 202. The server 110 displays 704 the current settings for site 100 to a user at the server 110 or at an endpoint running the server's 110 user interface. In on embodiment, the user displays the current settings for site 100 in an edit site panel, which lets the user edit the current site codec settings, specifically the codec list to use for each type of call. Additionally, if site 100 is coupled to multiple WANs, the user can select which WAN to use to communicate with each site in the telephony system 195.

Upon the user selecting to save the edited site codec settings, the server 110 receives 706 the edited site codec settings. The edited site codec settings are stored 708 by the server 110 at all switches 130 in site 100, specifically in each switch's 130 configuration storage module 202. In one embodiment, the edited codec list is stored at all switches in the telephony system 195. In an alternate embodiment, the new codec list is stored at select switches in the telephony system 195.

FIG. 11 is an example of the edit site panel 1102 used by a user for viewing or editing settings for site 100. Section 1104 includes fields where the site's general information settings can be edited. Bandwidth section 1106 includes an admission control bandwidth field 1110, which is the amount of total inter-site WAN bandwidth allocated to site 100. Intra-site calls dropdown 1112, inter-site calls dropdown 1114, and fax and modem calls dropdown 1116 each allows the user to set which codec list to use for each of those types of calls. It should be noted that if site 100 was coupled to multiple WANs, the edit site panel 1102 would include a bandwidth section and an inter-site dropdown for each WAN. Section 1108 includes fields where SIP proxy settings can be edited.

To save changes to the site codec settings, save button 1122 is pressed. New button 1118 is pressed to create a new set of site codec settings. To use the settings in the edit site panel 1102 as a template for creating a new set of site codec settings, copy button 1120 is pressed. Delete button 1124 is pressed to erase the site codec settings being viewed on the edit site panel 1102.

Figure 8A:
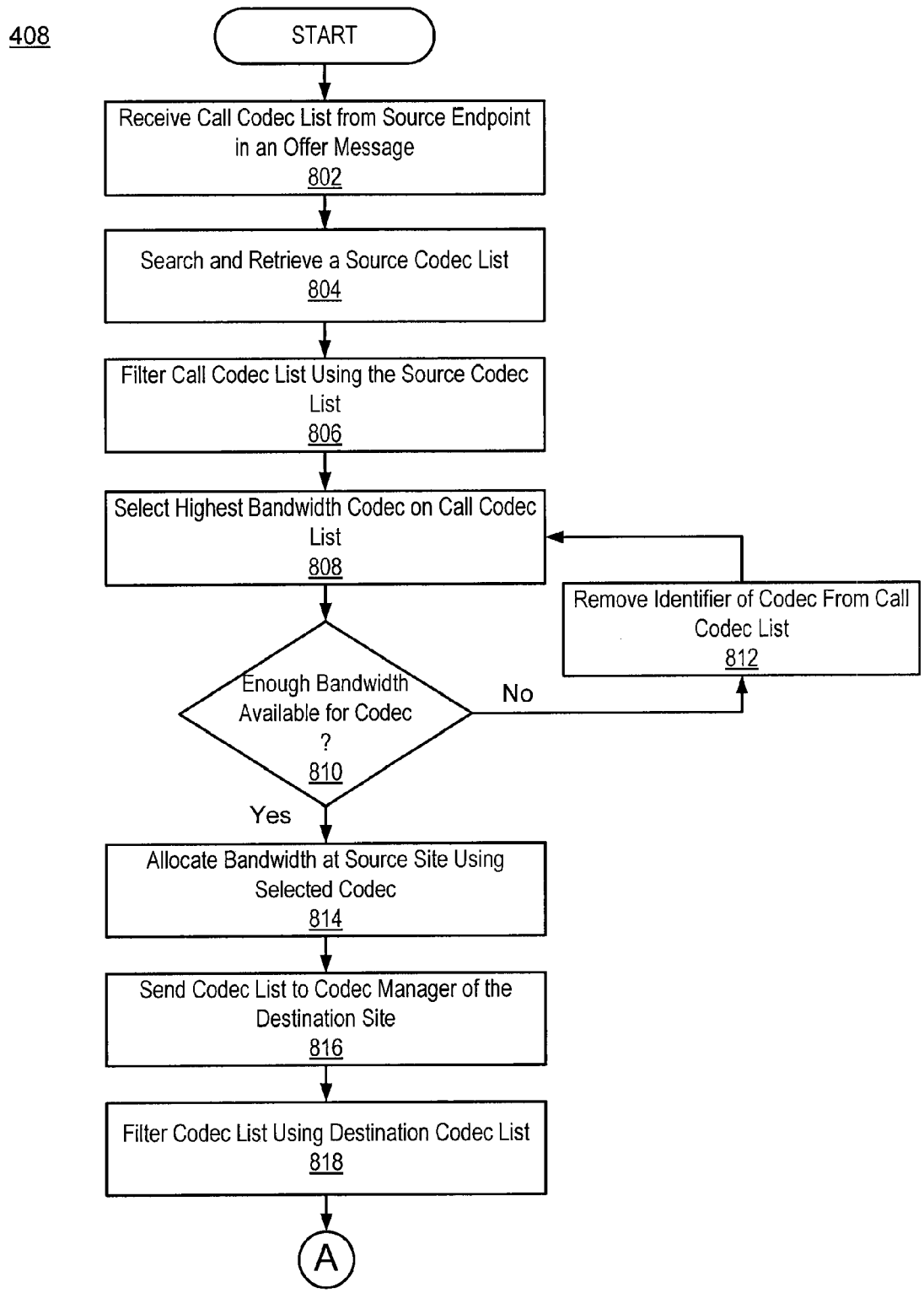
FIGS. 8A and 8B are a flowchart illustrating a method for negotiating a codec for an inter-site call between a source endpoint and a destination endpoint according to one embodiment of the present invention.
Figure 8B:
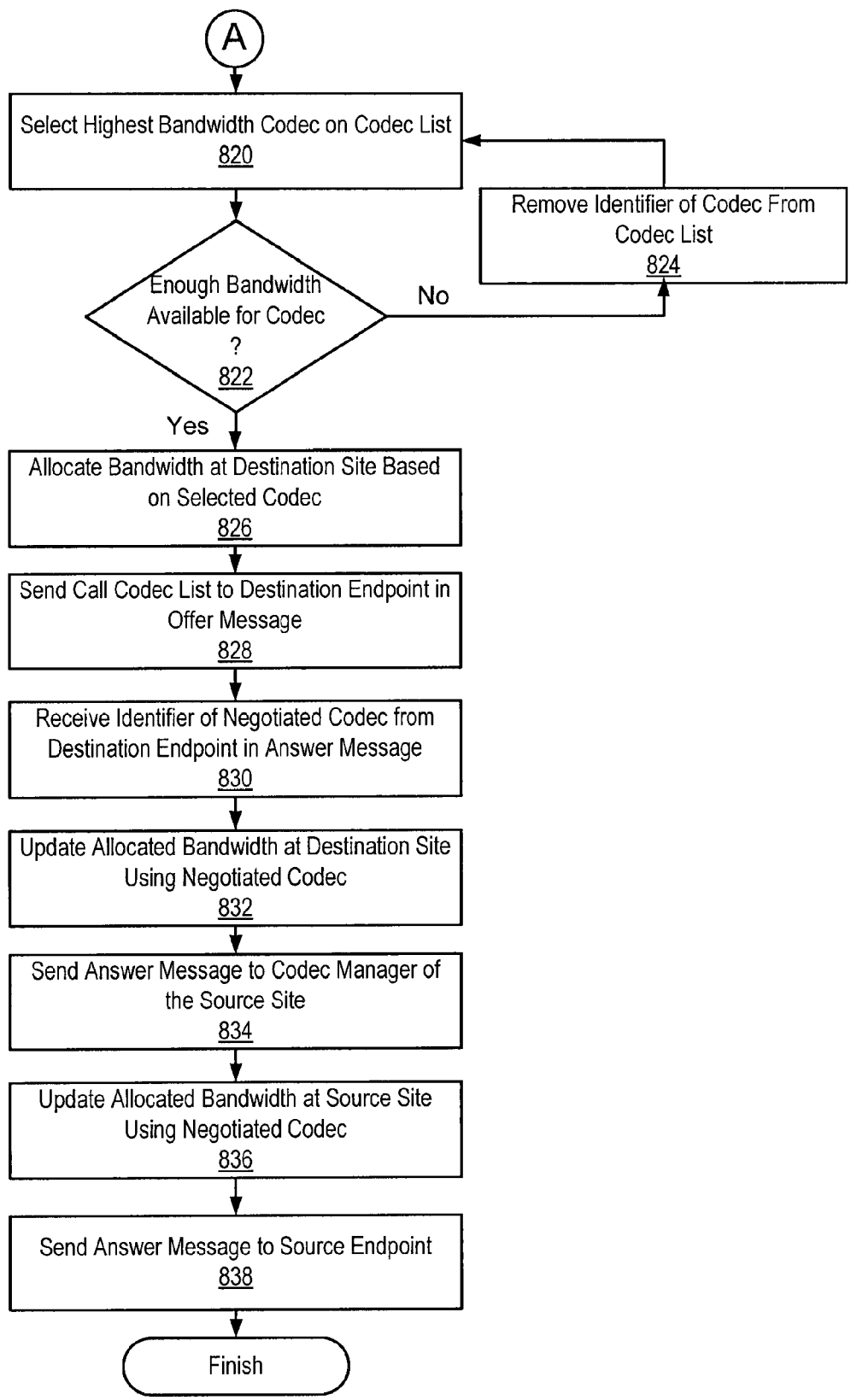

FIGS. 8A and 8B are a method 408 for negotiating a codec for an inter-site call between a source endpoint and a destination endpoint, which is step 408 of FIG. 4. Those of skill in the art will recognize that other embodiments can perform the steps of FIGS. 8A and 8B asynchronously or in different orders. Moreover, other embodiments can include different and/or additional steps than the ones described herein.

Figure 3:
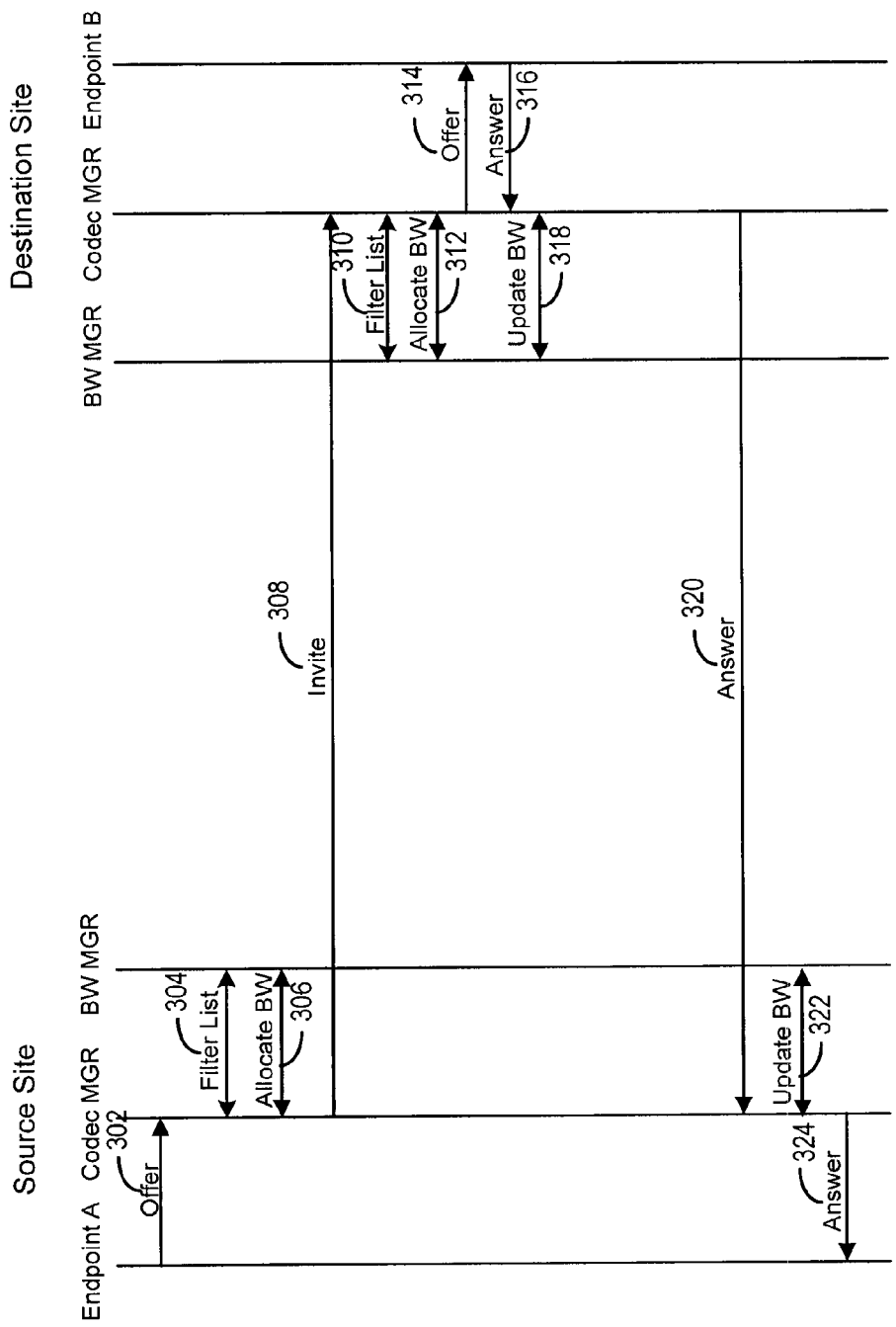
FIG. 3 is a diagram illustrating a method for negotiating a codec for an inter-site call between a source endpoint and a destination endpoint according to one embodiment of the present invention.

Initially, a codec manager 216 of a source site receives 802 in an offer message, a call codec list from the source endpoint (step 302 of FIG. 3). The call codec list includes an identification of each codec supported by the source endpoint. The codec manager 216 of the source site determines that the type of call being initiated is an inter-site call. The codec manager 216 of the source site searches 804 its corresponding configuration storage module 202 to identify which source codec list is to be used for an inter-site call. Once the codec manager 216 of the source site has identified the source codec list to use, it retrieves the source codec list from the configuration storage module 202.

The codec manager 216 of the source site uses the source codec list to filter 806 the call codec list (step 304). The codec manager 216 of the source site filters the call codec list by removing from the call codec list, identifiers of codecs that are not included in the source codec list. For example, if the call codec list includes identifier G726/8000, but the source codec list does not, identifier G726/8000 is removed from the call codec list. Additionally, as part of filtering the call codec list, the ranking of the identifiers in the call codec list is reordered by the codec manager 216 of the source site based on the order of the identifiers included in the source codec list.

The codec manager 216 of the source site selects 808 from the filtered call codec list the codec with the highest bandwidth. The codec manager 216 of the source site determines 810 whether the source site has enough bandwidth available to support the selected codec. If source site does not have enough available bandwidth to support the selected codec, the codec manager 216 of the source site removes 812 the identifier of the selected codec from the call codec list and steps 808 and 810 are repeated. Alternatively, if the source site has enough bandwidth available to support the selected codec, the bandwidth manager 218 of the source site uses the selected codec to allocate 814 bandwidth at the source site (step 306). If the codec manager 216 of the source site is connected to multiple WANs, the bandwidth manager 218 of the source site allocates bandwidth on whichever WAN a codec manager 216 of the destination site is coupled to. In one embodiment, if source site does not have enough bandwidth to support any of the codecs represented in the call codec list, the codec manager 216 of the source site rejects the call and sends a fail signal to the source endpoint.

The codec manager 216 of the source site sends 816 the call codec list to the codec manager 216 of the destination site. In one embodiment, the codec list is sent to the codec manager 216 of the destination site in an invite message (step 308). The codec manager 216 of the destination site retrieves a destination codec list for intra-site calls and uses the destination codec list to filter 818 the call codec list (step 310). The codec manager 216 of the destination site filters the call codec list by removing from the call codec list, identifiers of codecs that are not included in the destination codec list. Additionally, as part of filtering the call codec list, the ranking of the identifiers in the call codec list is reordered by the codec manager 216 of the destination site based on an algorithm that takes into account the order of the identifiers included in the destination codec list.

The codec manager 216 of the destination site selects 820 from the filtered call codec list the codec with the highest bandwidth. The codec manager 216 of the destination site determines 822 whether the destination site has enough bandwidth available to support the selected codec. If destination site does not have enough available bandwidth to support the selected codec, the codec manager 216 of the destination site removes 824 the identifier of the selected codec from the call codec list and steps 820 and 822 are repeated. In one embodiment, if destination site does not have enough bandwidth to support any of the codecs on the call codec list, the codec manager 216 of the destination site rejects the call and sends a fail signal to the codec manager 216 of the source site On the other hand, if the destination site has enough bandwidth available to support the selected codec, the bandwidth manager 218 of the destination site uses the selected codec to allocate 826 bandwidth at the destination site (step 312). In alternate embodiment, if the destination site has enough bandwidth available to support the selected codec, the codec manager 216 of the destination site skips step 826 and proceeds to step 828.

The codec manager 216 of the destination site sends 828 to the destination endpoint an offer message that includes the call codec list (step 314). The codec manager 216 of the destination site receives 830 from the destination endpoint an answer message that includes an identifier of a codec included in the call codec list sent to destination endpoint (step 316). The codec represented by the received identifier is referred to as the negotiated codec. In one embodiment, the destination endpoint determines which identifier to send back in the answer message, based on the codec represented in the codec list that has the highest bandwidth and is supported by the destination endpoint. The bandwidth manager 218 of the destination site uses the identifier of the negotiated codec to update the allocated 832 bandwidth at the destination site (step 318).

The codec manager 216 of the destination site sends 834 an answer message to the codec manager 216 of the source site that includes the identifier of the negotiated codec (step 320). The bandwidth manager 218 of the source site uses the received identifier to update 836 the allocated bandwidth at the source site (step 322). The codec manager 216 of the source site sends 838 an answer message to the source endpoint that includes the identifier of the negotiated codec (step 324). Once the source endpoint receives the identifier, the two endpoints use the negotiated codec to exchange audio, video and/or data streams using the negotiated codec.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for an Internet Protocol (IP) telephony system to support a new codec, the method comprising:
   receiving, at a server, a request from a user to add a description of the new codec, the new codec unsupported by the IP telephony system and unavailable for inclusion in one or more codec lists used for negotiating a codec;
   receiving, at the server, the description of the new codec from the user;
   storing the description of the new codec in the IP telephony system; and
   after storing the description of the new codec in the IP telephony system, supporting, by the IP telephony system, the new codec and making the new codec available for inclusion in the one or more codec lists used for negotiating a codec and wherein the codec is negotiated using the one or more codec lists, the one or more codec lists each including the new codec.

2. The method of claim 1, wherein the description of the new codec includes an identification string and a bandwidth value.

3. The method of claim 1, comprising presenting to the user a new codec panel to allow the user to enter the description of the new codec.

4. The method of claim 1, wherein the description of the new codec is stored in a switch in the IP telephony system.

5. The method of claim 1, wherein the IP telephony system includes a supported codecs storage, the one or more codec lists and a site settings storage, the supported codecs storage including descriptions of codecs supported by the IP telephony system, each codec list including an identification of one or more codecs, and the site settings storage including site settings for at least one site in the IP telephony system.

6. The method of claim 5, wherein the description of the new codec is stored at the supported codecs storage.

7. The method of claim 5, comprising presenting to the user a codec list panel that displays the one or more codec lists and allows the user to edit an existing codec list or create a new codec list.

8. The method of claim 7, comprising:
   receiving a request to edit a codec list;
   retrieving an identification of each codec supported by the IP telephony system from the supported codecs storage and the codec list;
   displaying the identification of each codec and the codec list; and
   receiving and storing a revised codec list at the IP telephony system.

9. The method of claim 8, wherein the identification of each codec and the codec list are displayed on an edit codec list panel that allows the user to edit the codec list.

10. The method of claim 9, wherein the edit codec list panel allows the user to add an identification of a codec to the codec list, remove an identification of a codec from the codec list, or change the ranking of codecs in the codec list.

11. The method of claim 5, comprising:
    receiving a request to create a new codec list;
    retrieving an identification of each codec supported by a switch from the supported codecs storage;
    displaying to the user the identification of each codec; and
    receiving and storing a new codec list at the IP telephony system.

12. The method of claim 11, wherein the identification of each codec is displayed on a new codec list panel that allows the user to create the new codec list.

13. The method of claim 12, wherein the new codec list panel allows the user to add an identification of a codec to the new codec list.

14. The method of claim 5, comprising:
    retrieving site settings from the site settings storage;
    displaying to the user the site settings; and
    receiving modifications to the site settings and storing modified site settings in the site settings storage.

15. The method of claim 14, wherein the site settings are displayed on an edit site panel that allows the user to edit the site settings.

16. The method of claim 15, wherein the edit site panel allows the user to assign a codec list for the IP telephony system to use for each type of call handled by the IP telephony system.

17. The method of claim 15, comprising responsive to the IP telephony system including multiple wide area networks (WANs), the edit site panel allowing the user to set site settings for each WAN.

18. A non-transitory computer readable storage medium including a computer readable program, wherein the computer readable program when executed on a computer causes the computer to:
    receive a request from a user to add a description of a new codec, the new codec unsupported by an Internet Protocol (IP) telephony system and unavailable for inclusion in one or more codec lists used for negotiating a codec;
    receiving the description of the new codec from the user;
    store the description of the new codec in the IP telephony system; and
    after storing the description of the new codec in the IP telephony system, support the new codec and make the new codec available for inclusion in the one or more codec lists used for negotiating a codec, and wherein the codec is negotiated using the one or more codec lists, the one or more codec lists each including the new codec.

19. The non-transitory computer readable storage medium of claim 18, wherein the description of the new codec includes an identification string and a bandwidth value.

20. The non-transitory computer readable storage medium of claim 18, wherein executing the computer readable program on the computer further causes the computer to:
    present to the user a new codec panel to allow the user to enter the description of the new codec.

21. The non-transitory computer readable storage medium of claim 18, wherein the description of the new codec is stored in a switch in the IP telephony system.

22. The non-transitory computer readable storage medium of claim 18, wherein the IP telephony system includes a supported codecs storage, the one or more codec lists and a site settings storage, the supported codecs storage including descriptions of codecs supported by the IP telephony system, each codec list including an identification of one or more codecs, and the site settings storage including site settings for at least one site in the IP telephony system.

23. The non-transitory computer readable storage medium of claim 22, wherein the description of the new codec is stored at the supported codecs storage.

24. The non-transitory computer readable storage medium of claim 22, wherein executing the computer readable program on the computer further causes the computer to:
 present to the user a codec list panel that displays the one or more codec lists and allows the user to edit an existing codec list or create a new codec list.

25. The non-transitory computer readable storage medium of claim 24, wherein executing the computer readable program on the computer further causes the computer to:
 receive a request to edit a codec list;
 retrieve an identification of each codec supported by the IP telephony system from the supported codecs storage and the codec list;
 display the identification of each codec and the codec list; and
 receive and store a revised codec list at the IP telephony system.

26. The non-transitory computer readable storage medium of claim 25, wherein the identification of each codec and the codec list are displayed on an edit codec list panel that allows the user to edit the codec list.

27. The non-transitory computer readable storage medium of claim 26, wherein the edit codec list panel allows the user to add an identification of a codec to the codec list, remove an identification of a codec from the codec list, or change the ranking of codecs in the codec list.

28. The non-transitory computer readable storage medium of claim 22, wherein executing the computer readable program on the computer further causes the computer to:
 receive a request to create a new codec list;
 retrieve an identification of each codec supported by a switch from the supported codecs storage;
 display to the user the identification of each codec; and
 receive and store a new codec list at the IP telephony system.

29. The non-transitory computer readable storage medium of claim 28, wherein the identification of each codec is displayed on a new codec list panel that allows the user to create the new codec list.

30. The non-transitory computer readable storage medium of claim 29, wherein the new codec list panel allows the user to add an identification of a codec to the new codec list.

31. A system comprising:
 a server for receiving a request from a user to add a description of a new codec, the new codec unsupported by an Internet Protocol (IP) telephony system and unavailable for inclusion in one or more codec lists used for negotiating a codec;
 a server for receiving the description of the new codec from the user;
 a storage module for storing the description of the new codec in the IP telephony system; and
 a switch for supporting the new codec after storing the description of the new codec in the IP telephony system, and making the new codec available for inclusion in the one or more codec lists used for negotiating a codec, and wherein the codec is negotiated using the one or more codec lists, the one or more codec lists each including the new codec.

32. The system of claim 31, wherein the description of the new codec includes an identification string and a bandwidth value.

33. The system of claim 31, further comprising:
 presenting to the user a new codec panel to allow the user to enter the description of the new codec.

34. The system of claim 31, wherein the description of the new codec is stored at a supported codecs storage.

35. The system of claim 31, wherein the IP telephony system includes a supported codecs storage, the one or more codec lists and a site settings storage, the supported codecs storage including descriptions of codecs supported by the IP telephony system, each codec list including an identification of one or more codecs, and the site settings storage including site settings for at least one site in the IP telephony system.

\* \* \* \* \*